United States Patent Office 2,713,038
Patented July 12, 1955

2,713,038

SULFONIUM ANION EXCHANGER

Geert J. de Jong, Geleen, Netherlands, assignor to Stamicarbon N. V., Heerlen, Netherlands No Drawing. Application February 8, 1954,
Serial No. 408,977

Claims priority, application Netherlands
February 10, 1953

9 Claims. (Cl. 260—2.1)

The present invention relates to new compositions of matter which have been found to have exceptional properties as strongly basic anion exchangers and is a modification of the invention described and claimed in co-pending application No. 300,115.

The invention also relates to the use of the said new compositions of matter as anion exchangers, especially for the purpose of removing silicic acid ions from water or solutions, for which purpose they are especially suitable.

According to the said co-pending application, a new composition of matter having strongly basic anion exchanging properties comprises a water insoluble, macromolecular organic resin carrying tertiary sulphonium groups.

The said co-pending application also describes and claims a process for preparing the said new compositions of matter either by introducing tertiary sulphonium groups having at least one aryl, aralkyl, alkyl or alkoxy aryl radical attached to the sulphur atom into a macromolecular compound or by polymerising or polycondensing a tertiary sulphonium compound having at least one aryl, aralkyl, alkyl or alkoxy aryl radical attached to the sulphur atom, of the sulphonium group, for example, with formaldehyde in the presence of sulphuric acid.

According to a preferred embodiment of the invention described in the said co-pending application the strongly basic anion exchange materials are those in which three alkoxy aryl radicals are bound to the sulphur atom of the sulphonium groups. These products may be obtained by condensing with formaldehyde, or a substance yielding formaldehyde, in the presence of concentrated sulphuric acid, a low molecular trialkoxy aryl sulphonium salt.

The trialkoxy aryl sulphonium salts required may be prepared by reacting an alkoxy aryl compound with sulphur dioxide, a thionyl halogenide, a halogenide of an alkoxy aryl sulphinic acid or a dialkoxy aryl sulphoxide, in the presence of a substance promoting cationoid substitution, such as aluminum trichloride.

Now, I have found that macromolecular resins of the type described hereinbefore, in which three alkoxy aryl groups, such as anisyl or phenetyl groups, are bound to the sulphur atom of the sulphonium groups, contain a certain percentage of weakly basic sulphonium groups along with the sulphonium groups, the presence of said weakly basic groups, being detrimental to the capacity in active strongly basic groups required for effective anion exchanging action of the said resins.

Moreover, I have found that when the said resins are employed as anion exchangers, in which employment a periodical regeneration with strong alkaline lye is included, the amount of said weakly basic groups increases, which constitutes a substantially undersirable phenomenon.

The principal object of the present invention is to provide anion exchange materials which to a substantial degree do not show the occurrence of weakly basic sulphonium groups and, when in practical use, are not subject to a decrease in capacity owing to an increase in the amount of said weakly basic groups.

A further object of the invention is to provide processes for the preparation of the said anion exchange materials of improved capacity.

Further objects of the invention will become apparent from the detailed description given hereinafter.

According to the invention, water insoluble, macromolecular organic resins carrying a plurality of sulphonium groups are prepared in which the sulphur atoms of the sulphonium groups are attached, on an average, to between 0.3 and 1.8 aryl or alkyl aryl radicals and, for the rest, to alkoxy aryl radicals.

Thus, over the preferred products mentioned hereinbefore, in which the sulphur atoms of the sulphonium groups are attached to three alkoxy aryl radicals, part of the alkoxy aryl radicals is replaced by aryl or alkyl aryl radicals, and the rest, ranging between 2.7 and 1.2 radicals per sulphur atom, on an average, is not replaced.

A complete replacement of the alkoxy aryl radicals, namely, by aryl or alkyl aryl radicals was found not to be useful in practice because the products then show various drawbacks, as, inter alia, a too strong swelling.

The anion exchangers may be prepared in various manners as described in the said co-pending application. However, the preparation is preferably started from low molecular sulphonium compounds which are condensed with an aldehyde or an aldehyde-yielding substance such as formaldehyde or paraformaldehyde, under the influence of a substance promoting the condensation, such as concentrated sulphuric acid.

The anion exchanger may be obtained in the form of foils or differently shaped products. By breaking and screening grains may be obtained. A very attractive form is the pellet form; pellets may be prepared by dispersing the reaction ingredients in an inert solvent and maintaining this dispersion at least so long that particles which no longer stick together have been formed.

The low molecular sulphonium compounds required for the preparation according to the invention may e. g., be obtained by adding such an amount of aluminum trichloride or another substance promoting cationoid substitution to a mixture of an alkoxy aryl compound and an aryl or alkyl aryl compound that, in addition to the alkoxy aryl compound, so much of the second compound enters the reaction as corresponds with the desired mean number of aryl or alkyl aryl groups in the final product to be prepared. Subsequently $SO_2$ is introduced into the resulting mixture or $SOCl_2$ or other thionyl halogenide added. It has been found that in this way it is easy to obtain low molecular sulphonium compounds which contain, besides alkoxy aryl groups, 0.3–1.8 of aryl or akyl aryl radicals per sulphur atom on an average.

Preferably, water-free aluminum trichloride is used as the substance promoting cationoid substitution, and that in an amount of between 1.1 and 1.3 mols per mol of alkoxy aryl compound present in the reaction mixture.

In the said preparation an excess of aryl or alkyl aryl compound not entering the reaction may be present and then acts as an inert solvent for the reaction ingredients.

As a low molecular sulphonium compound in which on an average a large percentage of aryl or alkyl aryl radicals is bound to the sulphur atom of the sulphonium groups sometimes condenses rather difficultly with an aldehyde, while moreover usually resins are formed which show a too great swelling, it may be advantageous to add to this compound other low molecular sulphonium compounds with a higher mean percentage of alkoxy aryl radicals before the polycondensation.

The following examples describe some modes of carrying out the process of the invention. It will be understood that the invention is not restricted to these examples. The parts given are parts by weight.

Example 1

300 parts of powdery water-free $AlCl_3$ were dissolved in a mixture of 200 parts of anisole and 400 parts of toluene while the mixture was being stirred and cooled. At a temperature of 0° C. 87 parts of dry gaseous $SO_2$ were introduced slowly at the rate of 10 litres per hour. Subsequently stirring was continued for two hours while the temperature was slowly raised to 50° C., after which the mixture was poured into water.

When steam was introduced into the aqueous solution about 300 parts of toluene were recovered. Subsequently the aqueous solution was extracted with chloroform.

In this way 300 parts of sulphonium salt were obtained. This salt was condensed with formaldehyde to a resin, which was done by adding a solution of 10 parts of paraformaldehyde in concentrated sulphuric acid to a solution of 70 parts of the sulphonium salt in concentrated sulphuric acid, and heating.

The resin obtained had a capacity of 510 m. eq. per litre in strongly basic and of 40 m. eq. per litre in weakly basic groups.

It was found that this resin retained silicic acid equally well with the trianisyl compound and proved to be equally capable of regeneration. The stability with respect to alkali proved to have been improved considerably. The swelling at the transition of the exchanger from the washed sulphate form into the washed hydroxyl form was about 20.%

Example 2

300 parts of water-free $AlCl_3$ were dissolved in a mixture of 160 parts of benzene and 200 parts of anisole while the mixture was cooled. In the course of 5 hours 87 parts of dry $SO_2$ were introduced into the resulting solution at 0° C., after which heating was effected for 1½ hours at 50° C. The reaction mixture was poured into water, the oil floating on top was separated off and steam introduced into the oil, and the aqueous layer was subsequently extracted with chloroform. The extract was added to the oil and this mixture was dried and subsequently evaporated. 300 parts of sulphonium salt were obtained. This salt was condensed with 50 parts of paraform in concentrated $H_2SO_4$. A resin was obtained which after being broken and washed showed good properties as a strongly basic anion exchanger.

Example 3

In the manner described in Example 1 a mixture of low molecular compounds was prepared by introducing 87 parts of $SO_2$ into the reaction product of 300 parts of $AlCl_3$ with a mixture of 200 parts of anisole and 200 parts of toluene and subsequently stirring the mixture for 2 hours, while raising the temperature to 50° C. The reaction product was poured into water and steam was introduced into it, in which process 80 parts of toluene were recovered. After extraction with chloroform and drying and evaporation of the extract an amount of about 300 parts of sulphonium salt was obtained. It appeared that on an average 2.0 methoxy groups occurred per molecule. This salt was condensed with paraformaldehyde (weight ratio paraform and salt 1:7). After processing a resin was obtained which proved to be an excellent silicic acid retainer. The capacity in strongly basic groups was 500 m. eq. per litre, and in weakly basic groups 50 m. eq. per litre as a maximum. After the exchanger had been kept in lye of 25° C. for three months, its capacity in strongly basic groups appeared to have diminished by 5%. A further decrease of the activity was not noticed. The swelling amounted to a maximum of 18%.

Example 4

300 parts of a low molecular sulphonium salt obtained according to Example 3 were mixed with 50 parts of trianisyl sulphonium chloride and subsequently condensed in a total amount of 400 parts of concentrated $H_2SO_4$ with 50 parts of paraformaldehyde.

The properties of the resulting resin were about equal to those mentioned in Example 3. The decrease in the capacity in strongly basic groups appeared to be somewhat greater; the swelling amounted to 10%.

Example 5

200 parts of anisole were mixed with 200 parts of technical xylene. While the mixture was cooled 300 parts of water-free $AlCl_3$ were added, after which 87 parts of dry $SO_2$ were introduced over a period of 4 hours, the mixture being cooled and stirred in the meantime.

After the reaction mixture had been stirred at room temperature for one hour it was heated at 50° C. for half an hour. The resulting reaction mixture was subsequently poured slowly into 1000 parts of ice-water. Now three layers formed, a dark-coloured layer of xylene, floating on top, which contained a large part of the non-active side-products, an aqueous solution of $AlCl_3$, which was saturated with the sulphonium salt formed, and a light-coloured viscous layer, mainly consisting of the sulphonium salt.

The xylene layer was decanted and distilled, in which process about 50 parts of side-products were left behind.

The two lower layers were extracted together by means of chloroform; from the extract 300 parts of a light-coloured sulphonium salt were obtained after evaporation. This substance contained about 1.8 methoxy groups per molecule on an average.

By condensation with paraformaldehyde in concentrated sulphuric acid in a ratio of 1:8, a resin was obtained which contained 500 m. eq. per litre in strongly basic and 70 m. eq. per litre in weakly basic groups. The maximum swelling appeared to be 10%.

I claim:

1. A process for the preparation of a strongly basic anion exchange resin which comprises condensing a member of the group consisting of formaldehyde and formaldehyde-liberating substances with a mixture of low molecular weight tertiary sulphonium salts in which the sulphur atoms of the sulphonium groups are attached, on an average, to between 0.3 and 1.80 radicals selected from the group consisting of monovalent aryl and alkyl aryl radicals and, for the remainder, to monovalent alkoxy aryl radicals, said mixture being obtained by reacting a sulphur compound selected from the group consisting of sulphur dioxide and the thionyl halogenides with a mixture of an aromatic hydrocarbon and an alkoxy aromatic hydrocarbon in the presence of a Friedel-Crafts catalyst.

2. A strongly basic anion exchange resin obtained by the process of claim 1.

3. A process for the preparation of a strongly basic anion exchange resin which comprises condensing a member of the group consisting of formaldehyde and formaldehyde-liberating substances in the presence of sulphuric acid with a mixture of low molecular weight tertiary sulphonium salts in which the sulphur atoms of the sulphonium groups are attached, on an average, to between 0.3 and 1.80 radicals selected from the group consisting of monovalent aryl and alkyl aryl radicals and, for the remainder, to monovalent alkoxy aryl radicals, said mixture being obtained by reacting a sulphur compound selected from the group consisting of sulphur dioxide and the thionyl halogenides with a mixture of an aromatic hydrocarbon and an alkoxy aromatic hydrocarbon in the presence of a Friedel-Crafts catalyst.

4. A process according to claim 3 wherein said mixture of low molecular weight tertiary sulphonium salts is obtained by reacting said sulphur compound, aromatic hydrocarbon and alkoxy-substituted aromatic hydrocarbon in the presence of between 1.1 and 1.3 mols of water-free aluminum trichloride per mol of alkoxy aromatic hydrocarbon.

5. A process according to claim 3 wherein said mixture of low molecular weight tertiary sulphonium salts is obtained by reacting sulphur dioxide with a mixture of anisole and an aromatic hydrocarbon selected from the group consisting of benzene, toluene and xylene in the presence of between 1.1 and 1.3 mols of water-free aluminum trichloride per mol of anisole.

6. A strongly basic anion exchange resin obtained by the process of claim 5.

7. A process according to claim 3 wherein said mixture of low molecular weight tertiary sulphonium salts is obtained using an excess of said aromatic hydrocarbon as solvent for the reactants.

8. A process for exchanging anions in solutions which comprises bringing the solution into contact with a strongly basic anion exchange resin obtained by the process of claim 1.

9. A process for removing silicic acid ions from liquid media containing said ions, which comprises contacting said media with a strongly basic anion exchange resin obtained by the process of claim 1.

References Cited in the file of this patent

UNITED STATES PATENTS 2,102,103     Urbain _____ Dec. 14, 1937